United States Patent
Yoshikawa

[19]

[11] Patent Number: 6,021,184
[45] Date of Patent: Feb. 1, 2000

[54] TELEPHONE APPARATUS, MODEM DEVICE, COMPUTER APPARATUS, AND COMMUNICATION TERMINAL DEVICE

[75] Inventor: Munehiro Yoshikawa, Kanagawa, Japan

[73] Assignee: Sony Corporation, Tokyo, Japan

[21] Appl. No.: 08/982,907

[22] Filed: Dec. 2, 1997

[30] Foreign Application Priority Data

Dec. 3, 1996 [JP] Japan .............................. P08-337620

[51] Int. Cl.[7] .................................................. H04M 11/00
[52] U.S. Cl. .................................... 379/93.09; 379/93.05; 379/100.12
[58] Field of Search .......................... 379/93.09, 93.05, 379/93.06, 93.07, 93.08, 93.01, 93.14, 93.27, 93.28, 100.12, 100.15, 110.01, 373, 376

[56] References Cited

U.S. PATENT DOCUMENTS

| | | | |
|---|---|---|---|
| 4,578,537 | 3/1986 | Faggin et al. | 379/93.09 |
| 4,740,963 | 4/1988 | Eckley | 370/110.1 |
| 5,535,204 | 7/1996 | Li | 370/76 |
| 5,822,406 | 10/1998 | Brown | 379/93.06 |
| 5,852,654 | 12/1998 | Song | 379/110.01 |

FOREIGN PATENT DOCUMENTS

9421077   9/1994   WIPO ........................... H04M 11/06

*Primary Examiner*—Paul Loomis
*Assistant Examiner*—Melur Ramakrishnaiah
*Attorney, Agent, or Firm*—Jay H. Maioli

[57] ABSTRACT

In a telephone apparatus, a modem device, a computer apparatus and a communication terminal device, the connection to different kinds of communication networks is realized with a simple structure. A data input/output device for converting a received analog signal into reception digital data to be supplied to a computer apparatus and for converting transmission digital data which is sent from the computer apparatus into an analog signal to be transmitted, a sound input/output device for inputting and outputting sound based on an output sound signal and an input sound signal, and a connection switching device for connecting the telephone circuit to the sound input/output device in the case of connecting to another telephone apparatus and, in the case of connecting to another computer apparatus, for connecting the computer apparatus to the sound input/output device are provided, and in addition, an output sound signal extracted by the computer from the reception digital data is outputted from the sound input/output device and an inputted input sound signal is converted into transmission digital data by the computer apparatus, so that sound can be inputted and outputted via a common sound input/output device in the case of connecting to another telephone apparatus or another computer apparatus.

23 Claims, 5 Drawing Sheets

TELEPHONE APPARATUS, MODEM DEVICE, COMPUTER APPARATUS, AND COMMUNICATION TERMINAL DEVICE

BACKGROUND OF THE INVENTION

1. Field of the Invention

This invention relates to a telephone apparatus, a modem device, a computer apparatus and a communication terminal device, and more particularly, is suitably applied to a telephone apparatus, modem device, computer apparatus and communication terminal device which are used as communication apparatuses which are connected to two or more different communication networks by utilizing a public telephone circuit.

2. Description of the Related Art

A public telephone circuit connects between communication parties by using telephone apparatuses as terminal devices for communicating between the parties by means of sound. However, in recent years, with the introduction of the Internet, computers are connected through the public telephone circuit so that not only sound information but also character and image information can be transmitted. If the conventional communication network in which the telephone apparatuses are connected is considered as a first network, the communication network in which the computer apparatuses are connected can be referred to as a second communication network.

The second communication network requires a structure for connecting between computer apparatuses. In other words, data is transmitted between the computer apparatuses by means of a digital signal. However, since an information signal is transmitted in the state of an analog signal on the public telephone circuit, a device which is referred to as a modem device is required between the computer apparatuses and the telephone circuit.

The information signal comprising the digital signal sent from the computer apparatus is inputted to the modem device. The modem device digital/analog-converts the information signal into an analog signal and transmits the obtained analog signal to the computer apparatus on the other party side through the public telephone circuit. The computer apparatus on the other party side receives an information signal comprising an analog signal, which is sent through the public telephone circuit, and inputs the information signal to the modem device. The modem device analog/digital-converts the inputted information signal to restore the signal to a digital signal, and supplies the obtained digital signal to the computer apparatus.

Each computer apparatus is capable of exchanging information signals through the public telephone circuit which can send only an analog signal, by attaching the modem device between the computer apparatus and the telephone circuit to analog/digital-convert or to digital/analog-convert the information signal. Since the computer network is formed by using an established public telephone circuit, various information can be transmitted to remote places such as other countries at relatively cheap cost.

By the way, there is a problem in that devices which are required to connect two different kinds of communication networks differ from each other; one device can not function the same way as another device.

For example, in communication by means of sound, an apparatus which is required for connecting with the public telephone circuit is a telephone apparatus. On the other hand, in the case of transmitting not only sound information but also character and image information for communication, a modem device and a computer apparatus are required as devices for connecting with the public telephone circuit; no telephone apparatus is required. Consequently, in the case of communication by means of character and image information in addition to communication by means of only sound information, the telephone apparatus, the modem device and the computer apparatus must be provided individually with the result that the overall structure and cost tend to increase.

SUMMARY OF THE INVENTION

In view of the foregoing, an object of this invention is to provide a telephone apparatus, a modem device, a computer apparatus and a communication terminal device which are capable of realizing connection to different kinds of communication networks with a simple structure.

The foregoing object and other objects of the invention have been achieved by the provision of a telephone apparatus comprising: a data input/output means, connected to a computer apparatus which converts an inputted input sound signal into transmission digital data and sends the transmission digital data while extracting an output sound signal from inputted reception digital data and sending the output sound signal, in the case of sending and receiving data by connecting to another computer apparatus through the telephone circuit, for converting a received analog signal into reception digital data so as to supply it to the computer apparatus while converting the transmission digital data, which is sent from the computer apparatus, into an analog signal to send it to another computer apparatus; a sound input/output means, in the case of connecting to another computer apparatus, for outputting sound on the basis of the inputted output sound signal while sending an input sound signal which is obtained by inputting sound; and a connection switching means for connecting the telephone circuit to the sound input/output means in the case of connecting to another telephone apparatus and moreover, for connecting the computer apparatus to the sound input/output means in the case of connecting to another computer apparatus.

The sound input/output means is connected to the computer apparatus in the case of receiving and sending data, and the output sound signal which is extracted from the reception digital data by the computer apparatus is outputted from the sound input/output means and the input sound signal which is inputted from the sound input/output means is converted into the transmission digital data by the computer apparatus, so that sounds can be inputted and outputted via the sound input/output means both in the case of connecting to another telephone apparatus and to another computer apparatus and so that the sound input/output interface can be shared.

Further, in the present invention, there are provided a data input/output means for converting an analog signal received through the telephone circuit into reception digital data and sending the reception digital data while converting inputted transmission digital data into an analog signal and sending the analog signal, and a connection switching means, connected to the telephone apparatus and the computer apparatus for extracting an output sound signal from the reception digital data which is supplied from the data input/output means and sending the output sound signal while converting inputted input sound signal into transmission digital data and supplying the transmission digital data to the data input/output means, for connecting the telephone circuit to the telephone apparatus in the case of connecting to another telephone apparatus and moreover, for connecting the telephone apparatus to the computer apparatus in the case of connecting to another computer apparatus.

The telephone apparatus is connected to another computer apparatus at the time of sending and receiving data with another computer, and an output sound signal which is extracted from the reception digital data by the computer apparatus is outputted from the telephone apparatus by means of sound and an input sound signal which is inputted from the telephone apparatus is converted into transmission digital data by the computer apparatus, so that sounds can be inputted and outputted via the telephone apparatus both in the case of connecting to another telephone apparatus and to the computer apparatus and so that the sound input/output interface can be shared.

Further, the present invention comprises a data input/output means for converting an analog signal received through the telephone circuit into reception digital data and sending the data while converting the inputted reception digital data into an analog signal and sending the analog signal, a data processing means for extracting an output sound signal from the reception digital data given from the data input/output means and sending the output sound signal while converting an inputted input sound signal into transmission digital data to supply the transmission digital data to the data input/output means, and a connection switching means, connected to the telephone apparatus for inputting and outputting sounds, for connecting the telephone circuit to the telephone apparatus in the case of connecting to another telephone apparatus and moreover, for connecting the telephone apparatus to the data processing means in the case of connecting to another computer apparatus.

The telephone apparatus is connected to the data processing means in the case of sending and receiving data with another computer apparatus, and an output sound signal extracted from the reception digital data by the data processing means is outputted from the telephone apparatus and the input sound signal which is inputted from the telephone apparatus is converted into transmission digital data by the data processing means, so that sound can be inputted and outputted via the telephone apparatus both in the case of connecting to another telephone apparatus and to another computer apparatus and so that the sound input/output interface can be shared.

Furthermore, in the present invention, data is transmitted and received by connecting to another telephone apparatus or another computer apparatus through the telephone circuit, and there are provided: a data input/output means, in the case of connecting to another computer apparatus through the telephone circuit, for converting the received analog signal into reception digital data and sending the reception digital data while converting the inputted transmission digital data into an analog signal and sending the analog signal; a data processing means for extracting an output sound signal from the reception digital data given from the data input/output means and sending the output sound signal while converting the inputted input sound signal into transmission digital data to supply the transmission digital data to the data input/output means; a sound input/output means, in the case of connecting to another computer apparatus, for outputting sound based on the output sound signal while sending the input sound signal which is obtained by inputting sound; and a connection switching means for connecting the telephone circuit to the sound input/output means in the case of connecting to another telephone apparatus and moreover, for connecting the data processing means to the sound input/output means in the case of connecting to another computer apparatus.

The sound input/output means is connected to the data processing means at the time of sending and receiving data with another computer apparatus, the output sound signal extracted from the reception digital data by the data processing means is outputted from the sound input/output means and the input sound signal which is inputted from the sound input/output means is converted into transmission digital data by the data processing means, so that sounds can be inputted and outputted via the sound input/output means both in the cases of connecting to another telephone apparatus and to another computer apparatus and so that the sound input/output interface can be shared.

The nature, principle and utility of the invention will become more apparent from the following detailed description when read in conjunction with the accompanying drawings in which like sections are designated by like reference numerals or characters.

DETAILED DESCRIPTION OF THE EMBODIMENT

Preferred embodiments of this invention will be described with reference to the accompanying drawings:

(1) First Embodiment

Figure 1:
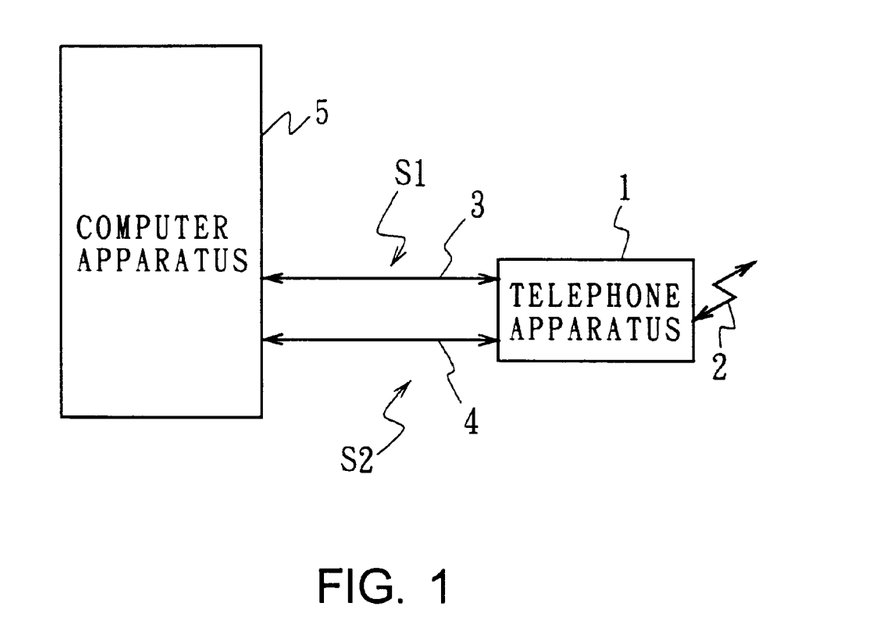
FIG. 1 is a block diagram showing a telephone apparatus according to a first embodiment of the present invention.

In FIG. 1, numeral 1 shows a telephone apparatus, which can be connected to a communication network by means of only sound information like a conventional telephone apparatus, and which can be connected to a computer network by means of character and image information.

The telephone apparatus 1 is connected with, for example, a telephone circuit such as a public telephone circuit so as to transmit data with another telephone apparatus or another computer apparatus (not shown) through the telephone circuit 2. In the case where the telephone apparatus 1 is connected to another telephone apparatus through the telephone circuit 2 (hereinafter, this is referred to as the time of circuit exchange), only the telephone apparatus 1 sends and receives sound. On the other hand, in the case where the telephone apparatus 1 is connected to another computer apparatus through the telephone circuit 2, the telephone apparatus 1 sends and receives data via the computer apparatus 5 connected with a serial circuit 3 and an audio circuit 4.

In the case of receiving a data signal sent from another computer apparatus, the telephone apparatus 1 inputs the data signal comprising an analog signal through the telephone circuit 2. Here, the data signal is originally a digital signal, but the data signal is converted into an analog signal by the computer apparatus of the other party and is converted into a signal within a predetermined frequency bandwidth because the signal is sent through the telephone circuit 2. The telephone apparatus 1 decodes the data signal while restoring the data signal into a digital signal. Furthermore, in the case where the data signal is compressed, the signal is subjected to an expanding process. The telephone apparatus 1 supplies the obtained digital signal S1 to the computer apparatus 5 through the serial circuit 3 such as RS-232C. The computer apparatus 5 receives the supplied digital signal S1, and then outputs and displays it by performing a predetermined process.

Similarly, in the case where the telephone apparatus 1 transmits data to another computer apparatus, the telephone apparatus 1 inputs the digital signal S1 comprising a transmission data signal, which is generated by the computer apparatus 5, through the serial circuit 3 to compress the data of the digital signal S1 while, at the same time, converting the digital signal into an analog signal and modulating the digital data into a signal within a predetermined frequency bandwidth and thereby transmitting the data through the telephone circuit 2.

In addition, the telephone apparatus 1 is connected to the computer apparatus 5 by the audio circuit 4. The computer apparatus 5 extracts sound data in the case where the aforementioned digital signal S1 includes the sound data, and then supplies the obtained analog audio signal S2 to the telephone apparatus 1 through the audio circuit 4. The telephone apparatus 1 outputs sound of the supplied audio signal S2. Similarly, the analog sound signal inputted via the telephone apparatus 1 by a user is supplied to the computer apparatus 5 through the audio circuit 4 as an audio signal S2. The computer apparatus 5 performs a predetermined data processing on the audio signal S2 to convert the audio signal into digital sound data in order to generate a digital signal S1, and then supplies the digital signal S1 to the telephone apparatus 1 through the serial circuit 3. The telephone apparatus 1 compresses the data of the digital signal S1 while converting the digital signal S1 into an analog signal and modulating the digital signal to a signal within a predetermined frequency bandwidth, and then transmits the signal through the telephone circuit 2.

Figure 2:
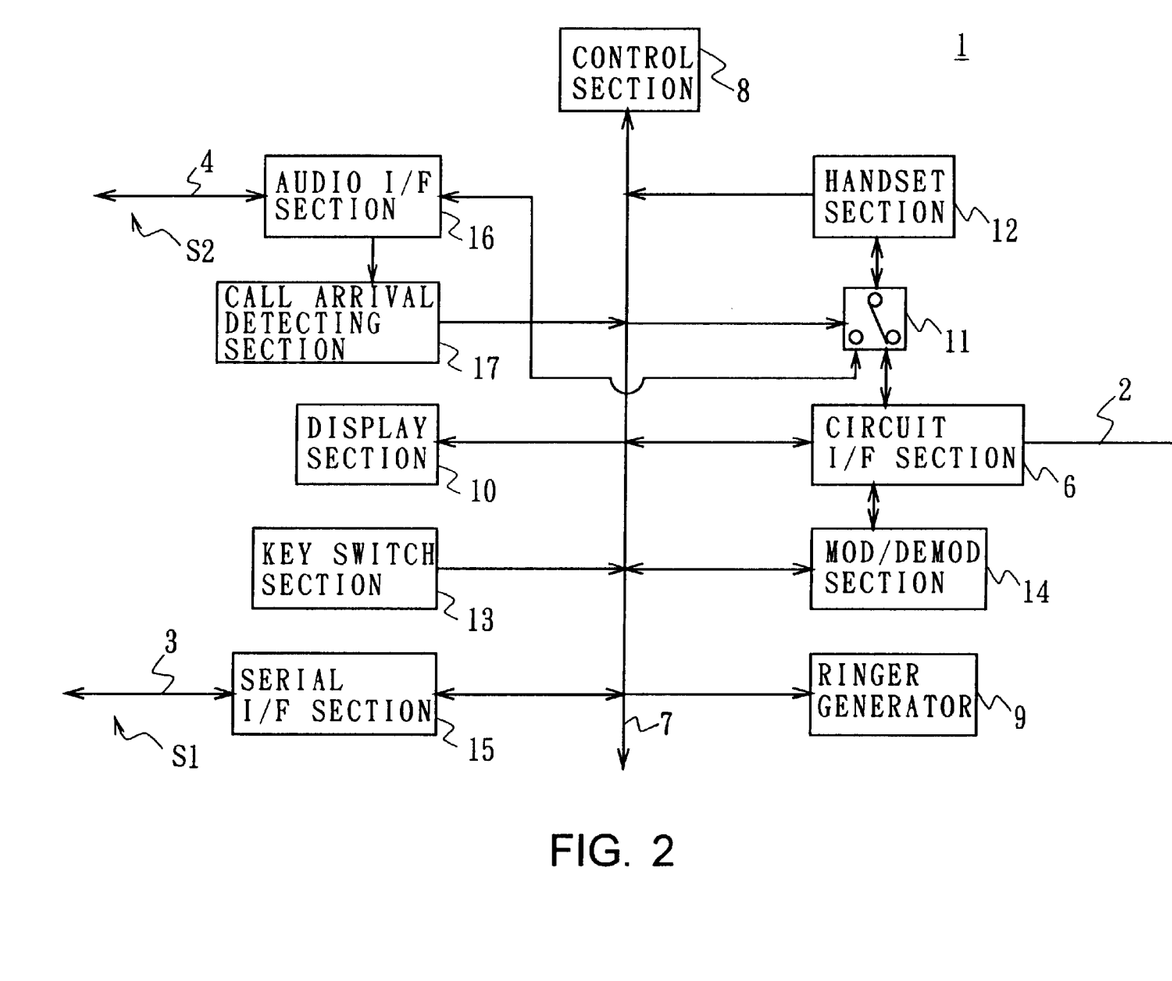
FIG. 2 is a block diagram showing an inside structure of the telephone apparatus.

In FIG. 2 in which the same reference numerals are applied to parts corresponding to FIG. 1, numeral 1 shows the inside structure of the telephone apparatus as a whole, where the data signal received through the telephone circuit 2 is inputted to a circuit I/F section 6. At the time of circuit exchange, the circuit I/F section 6 recognizes from the frequency or the like of the signal whether or not the data signal is a call signal from another telephone apparatus. If the data signal is a call signal from another telephone apparatus, the circuit I/F section 6 notifies a control section 8 through an internal bus 7.

The control section 8 supplies a control signal to a ringer generator 9 and a display section 10 through the internal bus 7 in response to the notification. The ringer generator 9 outputs a call arrival sound corresponding to the control signal and the display section 10, for example, it blinks, in order to inform the user of the call arrival.

Here, the circuit I/F section 6 is connected to an input terminal on one side of the change-over switch 11 while a handset section 12 is connected to an output terminal of the change-over switch 11. After the control section 8 supplies the control signal to the ringer generator 9 and the display section 10, the hook state of the handset section 12 is detected. When a user picks up the handset section 12 having a microphone and a speaker in response to the notification of the call arrival, the control section 8 detects an off-hook state of the handset section 12 and sends a change-over signal to the change-over switch 11. Accordingly, the change-over switch 11 changes over the switch so that the input terminal, to which the circuit I/F section 6 is connected, is connected to the output terminal to which the handset section 12 is connected.

Consequently, the telephone apparatus 1 connects the handset section 12 to the telephone circuit 2 via the change-over switch 11 and the circuit I/F section 6, thereby establishing the ability to talk on the phone.

Note that, the telephone apparatus 1 has a key switch section 13, and when a desired telephone number is inputted by operating the key switch section 13, the telephone number is supplied to the control section 8 through the internal bus 7. The control section 8 issues a call to the party having the telephone number through the internal bus 7, the circuit I/F section 6, and the telephone circuit 2, respectively.

Further, when the user places the handset section 12 at the original position, the control section 8 detects the off-hook state of the handset section 12 to terminate the call.

On the other hand, if the inputted data signal is not a call signal from another telephone apparatus, the circuit I/F section 6 supplies the data signal to a modulating/demodulating section 14. Incidentally, this is the case where the data is transmitted between the computer apparatus on the other party and the computer apparatus 5 (FIG. 1) through the telephone circuit 2. It is supposed that a connection with the computer apparatus on the side of the other party is already established.

The modulating/demodulating section 14 performs an expanding process on the data signal in the case where the data signal has been compressed while, at the same time, the data signal is subjected to a demodulating process and analog/digital conversion to convert the signal to a digital signal S1. The modulating/demodulating section 14 sends the obtained digital signal S1 to the serial I/F section 15 through the internal bus 7. The serial I/F section 15 supplies the digital data S1 to the computer apparatus 5 through the serial circuit 3. The computer apparatus 5 performs a predetermined data processing on the supplied digital signal S1 to output and display character information and image information comprising the digital signal S1 on a monitor (not shown).

Further, as described above, if the digital signal S1 includes sound data, the computer apparatus 5 supplies an analog audio signal S2 which is obtained by extracting the sound data to the telephone apparatus 1 through the audio circuit 4. The telephone apparatus 1 inputs the audio signal S2 to an audio I/F section 16.

The audio I/F section 16 sends the audio signal S2 to the other input terminal of the change-over switch 11 while giving the signal to a call arrival detecting section 17. When the call arrival detecting section 17 detects a sound signal showing a call arrival notification from the audio signal S2, the call arrival detecting section 17 notifies the control section 8 of the call arrival. For example, when the call arrival is received from the computer apparatus on the side of the other party, the data signal includes a call arrival notification signal. For example, in the case of the Internet, the call arrival notification signal comprises a tone signal of 400 [Hz], and the call arrival notification signal can not be detected with the circuit I/F section 6. The telephone apparatus 1 is constituted in such a manner that such a call arrival notification signal is temporarily sent to the computer apparatus 5 to be converted into an analog sound signal thereby identifying the call arrival by detecting the sound signal from the obtained audio signal S2.

In response to the notification, the control section 8 supplies the control signal to the ringer generator 9 and the display section 10 through the internal bus 7. Accordingly, the ringer generator 9 outputs a call arrival sound which is different from the sound generated in the case of the aforementioned circuit exchange, and the display section 10 also blinks in a different manner from the circuit exchange, thereby notifying the user of the call arrival from the computer apparatus on the side of the other party.

When the user picks up the handset section 12 having a microphone and a speaker in response to the call arrival notification, the control section 8 detects the off-hook state of the handset section 12 and sends the change-over signal to the change-over switch 11. Accordingly, the change-over switch 11 changes over the connection in such a manner that the input terminal, to which the audio I/F section 16 is connected, is connected to an output terminal to which the handset section 12 is connected. As a consequence, the telephone apparatus 1 connects the handset section 12 to the computer apparatus 5 via the change-over switch 11, the audio I/F section 16 and the audio circuit 4, in order to output the sound data included in the aforementioned data signal from the speaker of the handset section 12.

When the sound is inputted from the microphone of the handset section 12 in the state of the established connection as described above, the sound is converted into a sound signal to be given to the computer apparatus 5 via the change-over switch 11, the audio I/F section 16 and the audio circuit 4. The computer apparatus 5 processes the sound signal to generate a digital signal S1 to be supplied to the telephone apparatus 1 through the serial circuit 3. The telephone apparatus 1 supplies the digital signal S1 to the modulating/demodulating section 14 via the serial I/F section 15 and the internal bus 7, respectively. After the modulating/demodulating section 14 compresses the data of the digital signal S1, it converts the digital signal S1 into an analog signal while, at the same time, modulating the digital signal by means of a predetermined modulation method, in order to generate a data signal. Then the modulating/demodulating section 14 sends the data signal to the telephone circuit 2 via the circuit I/F section 6 in order to send it to the computer apparatus on the side of the other party.

Note that, similarly to the time of the circuit exchange, when the user places the handset section 12 at the original position, the control section 8 detects the on-hook state of the handset section 12 thereby ending the data transmission with the computer apparatus on the side of the other party.

In the aforementioned configuration, at the time of the circuit exchange, the telephone apparatus 1 recognizes through the circuit I/F section 6 that the received data signal is sent from another telephone apparatus, notifies the control section 8 of the recognition, and changes over the connection of the change-over switch 11 in accordance with the change-over signal which is sent from the control section 8 at the time of the off-hook state, so that conversation can be established by connecting the handset section 12 to the telephone circuit 2 via the change-over switch 11 and the circuit I/F section 6.

Furthermore, in the case where a data signal is received through the telephone circuit 2 during connecting to another computer apparatus, the data signal is given to the modulating/demodulating section 14 via the circuit I/F section 6. The data signal is subjected to an expanding process and a demodulating process, and is converted into a digital signal S1. The obtained digital signal S1 is given to the computer apparatus 5 via the internal bus 7, the serial I/F section 15 and the serial circuit 3, respectively. The digital signal S1 is outputted and displayed by means of characters or images by data processing of the computer apparatus 5.

Further, in the case where the received data signal includes sound data, the sound data is extracted from the digital data S1 by the computer apparatus 5 and is sound-processed, and then the sound data is supplied to the handset section 12 via the audio circuit 4, the audio I/F section 16 and the change-over switch 11 as an audio signal S2. At this time, the call arrival notification signal added to the data signal at the time of the start of call arrival is detected by the call arrival detecting section 17. In accordance with the detection result and the off-hook state of the handset section 12, the change-over switch 11 is changed over depending on the change-over signal sent from the control section 8, so that sound based on the audio signal S2 is outputted from the speaker of the handset section 12. Furthermore, in the case where sound is inputted from the microphone of the handset section 12 during such connection, the sound is given to the computer apparatus 5 via the change-over switch 11, the audio I/F section 16 and the audio circuit 4 as a sound signal. Then the sound signal is converted into digital sound data by sound processing of the computer apparatus 5. The obtained sound data and character and image data generated by the computer apparatus 5 are given to the telephone apparatus 1 as a digital signal S1 through the serial circuit 3 and the digital signal S1 is transmitted to another computer apparatus through the serial I/F section 15, the modulating/demodulating section 14, the circuit I/F section 6 and the telephone circuit 2, respectively. Thus, the telephone apparatus 1 is capable of transmitting data with another computer apparatus.

In this manner, at the time of circuit exchange with another telephone apparatus and the time of the data transmission with another computer apparatus, the telephone apparatus 1 recognizes through the circuit I/F section 6 or the call arrival detecting section 17 whether the received data signal is sent from another telephone apparatus or is sent from another computer apparatus, thereby changing over the connection of the change-over switch 11. As a consequence, sound can be inputted and outputted with the handset section 12 in both cases described above. In addition, similarly, different call arrival sounds are outputted from the ringer generator 9 at the time of circuit exchange with another telephone apparatus and at the time of data transmission with another computer apparatus, so that it is possible to differentiate whether the received data signal is sent from another telephone or another computer apparatus to notify the user of the call arrival.

Furthermore, the on-hook and the off-hook positions of the handset section 12 can control the start and the end of the conversation on the phone at the time of the circuit exchange with another telephone apparatus and moreover, can control the start and end of the data transmission at the time of the data transmission with another computer apparatus. Furthermore, since a desired telephone number is inputted from the key switch section 13, it is possible to issue a call to a desired party both at the time of the circuit exchange with another telephone apparatus and at the time of the data transmission with another computer apparatus.

As a consequence, the telephone apparatus 1 can use the same interface structure for the input and output of sound, call arrival notification, control of communication start and end, and types of calls using different kinds of communications, so that it is not necessary to provide different structures according to kinds of communication used between the telephone apparatus 1 and the computer apparatus 5.

In the aforementioned structure, the telephone apparatus 1, which has the modulating/demodulating section 14, the change-over switch 11, the serial I/F section 15, the audio I/F section 16 and the call arrival detecting section 17, is connected to the computer apparatus 5, which extracts sound data from the digital signal S1 to generate an audio signal S2 and converts the audio signal S2 into a digital signal S1 so that talking on the phone is established by changing over the change-over switch 11 so as to connect the handset section 12 to the circuit I/F section 6 as a result of the recognition of the circuit I/F section 6 at the time of circuit exchange, on the other hand, so that sound data is inputted and outputted via the computer apparatus 5 by changing over the change-over switch 11 so as to connect the handset section 12 to the audio I/F section 16 by the detection of the call arrival notification signal of the call arrival detecting section 17 at the time of connecting to the other computer apparatus. As a consequence, separate structures are not required to be provided depending on the kinds of communication, so that talk and input and output of sound data can be performed with the handset section 12. Thus, the input/output interface can be shared in different kinds of communication with a simple structure.

(2) Second Embodiment

Figure 3:
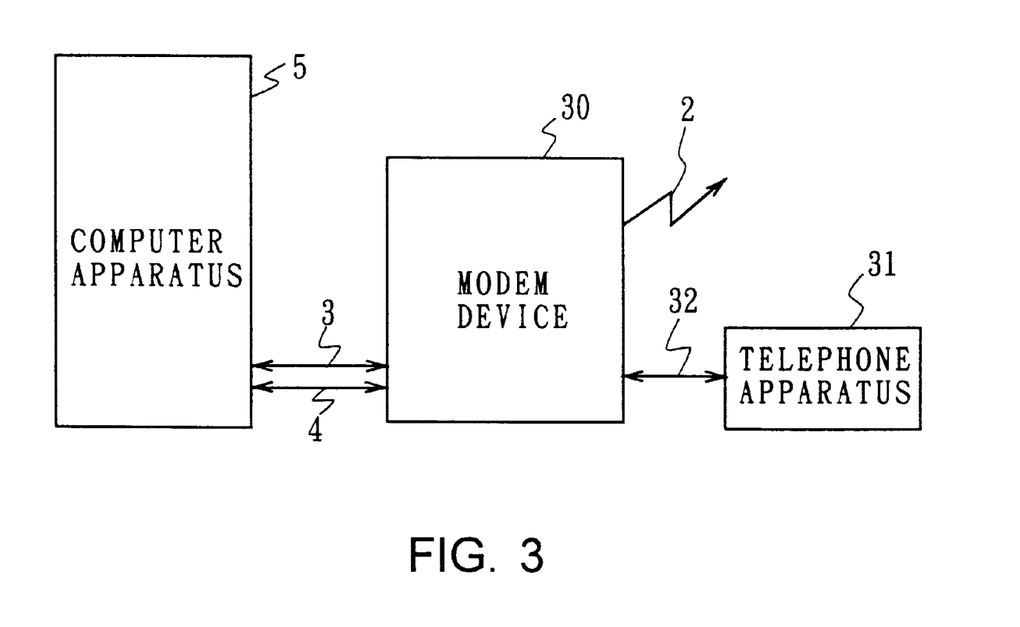
FIG. 3 is a block diagram showing a structure of a modem device according to a second embodiment of the present invention.

In FIG. 3 in which the same reference numerals are applied to parts corresponding to FIG. 1, numeral 30 shows a modem device which is provided between a telephone apparatus 31 and the computer apparatus 5. The modem device 30 is connected with the telephone circuit 2 and is connected to another telephone apparatus or another computer apparatus (not shown) via the telephone circuit. In addition, the modem device 30 is connected to the telephone apparatus 31 through the circuit 32 and is connected to the computer apparatus 5 through the serial circuit 3 and the audio circuit 4.

Figure 4:
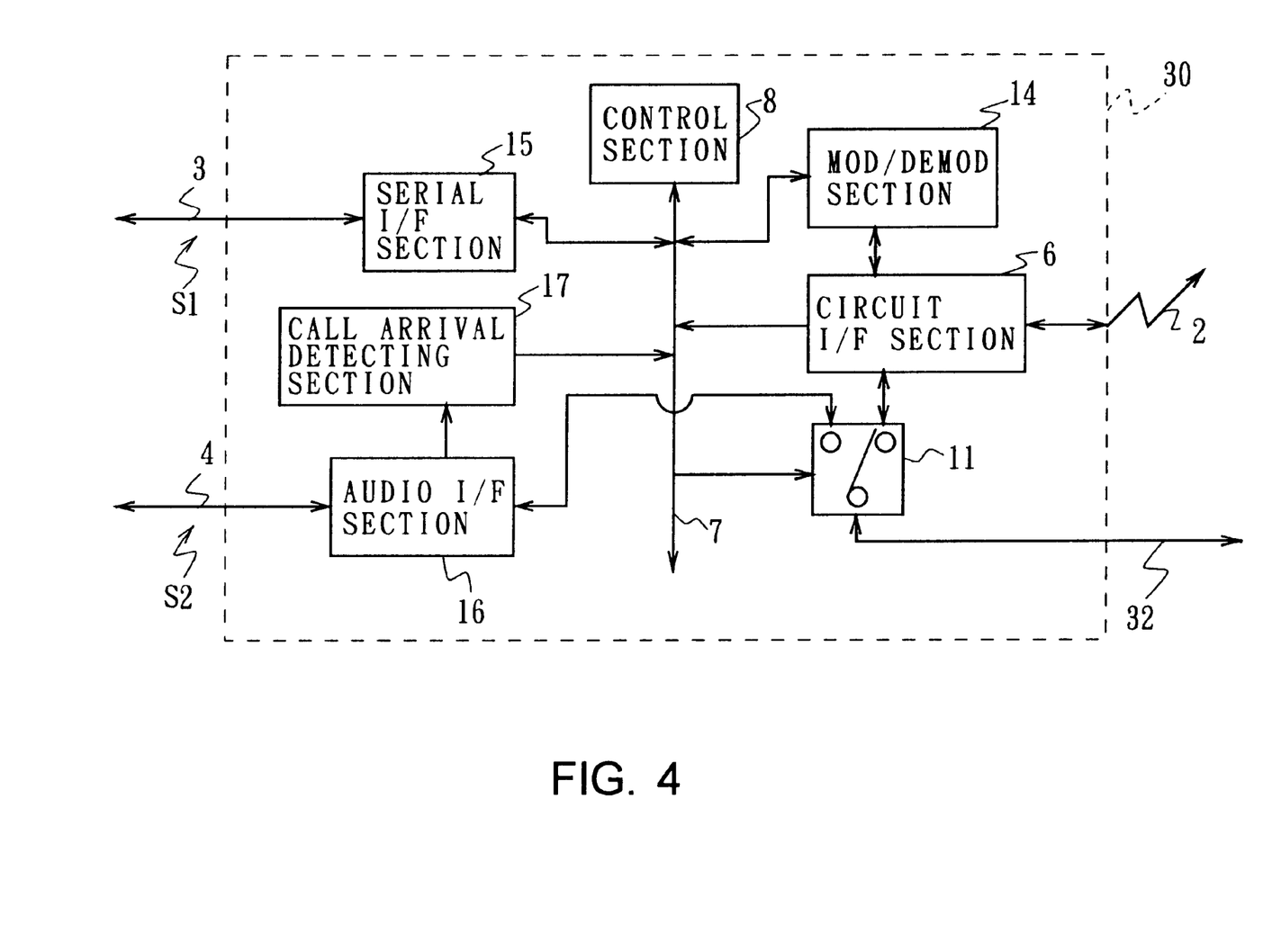
FIG. 4 is a block diagram showing an inside structure of the modem device.

The modem device 30 has the internal structure shown in FIG. 4 in which the same reference numerals are applied to parts corresponding to FIG. 2. The modem device 30 sends and receives data signals using the circuit I/F section 6 connected with the telephone circuit 2. At the time of circuit exchange, the circuit I/F section 6 recognizes from the frequency or the like of the signal whether or not the data signal is a call signal from another telephone apparatus. If the data signal is a call signal from another telephone apparatus, the circuit I/F section 6 notifies the control section 8 through the internal bus 7. The control section 8 sends a change-over signal to the change-over switch 11 through the internal bus 7 in response to the notification. One end of the input terminal of the change-over switch 11 is connected to the circuit I/F section 6 while the output terminal is connected to the circuit 32. The change-over switch 11 changes over the connection of the input terminal and the output terminal so as to connect the circuit I/F section 6 to the circuit 32 depending on the change-over signal. Thereby the telephone apparatus 31 is connected to the telephone apparatus 2.

On the other hand, if the data signal is not received from another telephone apparatus, the circuit I/F section 6 supplies the data signal to the modulating/demodulating section 14. Incidentally, this is the case where data is transmitted through the telephone circuit 2, for example, between another computer apparatus and the computer apparatus 5. It is supposed that the connection to the computer apparatus on the side of the other party is already established.

The modulating/demodulating section 14 performs an expanding process on the supplied data signal when the data signal has been compressed while, at the same time, the data signal is subjected to the demodulating process and the analog/digital conversion in order to be converted into a digital signal S1. The modulating/demodulating section 14 sends the obtained digital signal S1 to the serial I/F section 15 through the internal bus 7. The serial I/F section 15 supplies the digital signal S1 to the computer apparatus 5 through the serial circuit 3. Incidentally, the computer apparatus 5 outputs and displays characters and images based on the supplied digital signal S1.

Further, the computer apparatus 5 has a sound processing section (not shown). In the case where the digital signal Si includes sound data, the sound data is extracted as an analog audio signal S2 by sound processing of hardware or software to be supplied to the modem device 30 through the audio circuit 4. The modem device 30 inputs the obtained audio signal S2 to the audio I/F section 16.

The audio I/F section 16 sends the audio signal S2 to the other input terminal of the change-over switch 11 while giving the audio signal S2 to the call arrival detecting section 17. In the case where the call arrival detecting section 17 detects the sound signal showing the call arrival notification from the audio signal S2, the call arrival detecting section 17 notifies the control section 8 of the call arrival. For example, in the case of the call arrival from the computer apparatus on the side of the other party, the data signal includes the call arrival notification signal. For example, in the case of the Internet, the call arrival notification signal comprises a tone signal of 400 [Hz]. The call arrival notification signal cannot be detected with the circuit I/F section 6. The modem device 30 temporarily sends the call arrival notification signal to the computer apparatus 5 to convert the signal to an analog sound signal, and then receives the obtained audio signal S2 to detect the tone signal from the frequency or the like.

When the call arrival is notified in this way, the control section 8 sends a change-over signal to the change-over switch 11. Accordingly, the change-over switch 11 changes over the connection of the switch so that the input terminal, to which the audio I/F section 16 is connected, is connected to the output terminal to which the circuit 32 is connected. As a consequence, the telephone apparatus 31 is connected to the audio I/F section 16 via the change-over switch 11, so that the sound data included in the aforementioned data signal is outputted from the speaker of the receiver. Furthermore, when the telephone apparatus 31 is connected to the audio I/F section 16 via the change-over switch 11 in this way, the audio I/F section 16 supplies the notification signal to the telephone apparatus 31 so that the call arrival is notified to the user by sounding the ringer of the telephone apparatus 31 (not shown).

Furthermore, in the case where sound is inputted from the microphone of the handset section of the telephone apparatus 31 in the state of the established connection, the sound is converted into a sound signal to be supplied to the computer apparatus 5 via the change-over switch 11, the audio I/F section 16, and the audio circuit 4. The computer apparatus 5 processes the sound signal to generate a digital signal S1 to be given to the modem device 30 through the serial circuit 3. The modem device 30 supplies the digital signal S1 to the modulating/demodulating section 14 via the serial I/F section 15 and the internal bus 7, respectively. The modulating/demodulating section 14 compresses the digital signal S1, and then converts the digital signal S1 into an analog signal while modulating the signal in accordance with a predetermined modulation method, thereby generating a data signal. The data signal is sent to the telephone circuit 2 via the circuit I/F section 6 to be transmitted to the computer apparatus on the side of the other party.

In the aforementioned structure, at the time of circuit exchange, in the case where the modem device 30 recognizes through the circuit I/F section 6 that the received data signal is sent from another telephone apparatus, the recognition result is notified to the control section 8, and the connection of the change-over switch 11 is changed over by the change-over signal sent from the control section 8. As a consequence, the telephone apparatus 31 is connected to the telephone circuit 2 via the change-over switch 11 and the circuit I/F section 6, thereby establishing a talk on the phone.

Further, in the case where the data signal is received through the telephone circuit 2 during connecting with another computer apparatus, the data signal is given to the modulating/demodulating section 14 via the circuit I/F section 6 so that the data expanding process, the demodulating process and the conversion into a digital signal S1 are carried out. The obtained digital signal S1 is given to the computer apparatus 5 via the internal bus 7, the serial I/F section 15 and the serial circuit 3, respectively. The digital signal S1 is subjected to data processing by the computer apparatus 5 to be outputted and displayed as characters or images.

Further, in the case where the received data signal includes sound data, the sound data is extracted from the digital signal S1 by the computer apparatus 5 to be processed. Then the data signal is supplied as an audio signal S2 to the telephone apparatus 31 via the audio circuit 4, the audio I/F section 16, the change-over switch 11 and the circuit 32, respectively. At this time, the call arrival signal added to the data signal at the time of the start of call arrival is detected by the call arrival section 17, with the result that the connection of the change-over switch 11 is changed over by the change-over signal supplied from the control section 8 in accordance with the detection result, and sound based on the audio signal S2 is outputted from the speaker of the telephone apparatus 31.

Further, when sound is inputted from the microphone of the telephone apparatus 31 during such connection, the sound is given as a sound signal to the computer apparatus 5 via the change-over switch 11, the audio I/F section 16, and the audio circuit 4 to be converted into digital sound data by a predetermined sound processing. The obtained sound data and the character and image data generated by the computer apparatus 5 are given to the modem device 30 through the serial circuit 3 as digital signals 91 and transmitted to another computer apparatus via the serial I/F section 15, the modulating/demodulating section 14, the circuit I/F section 6 and the telephone circuit 2, respectively. As a consequence, the modem device 30 can transmit data to another computer apparatus.

In this manner, the modem device 30 recognizes through the circuit I/F section 6 or the call arrival detecting section 17 at the time of circuit exchange with another telephone apparatus or at the time of data transmission with another computer apparatus whether the received data signal is sent from another telephone apparatus or from another computer apparatus, thereby changing over the connection of the change-over switch 11, so that sound can be inputted and outputted with the telephone apparatus 31 via the circuit 32 in both aforementioned cases.

In this manner, in the modem device 30, the interface for the input/output of sound at the time of different kinds of communications can be used by the telephone apparatus 31, thereby making it possible to eliminate the need to separately provide these structures, which depend on the kinds of communication, with the telephone apparatus 31 and the computer apparatus 5. Thus, the interface for the input/output of sound can be shared by adding the modem device 30 between a conventional telephone apparatus and a computer apparatus.

In the aforementioned configuration, the modem device 30, which has the modulating/demodulating section 14, the change-over switch 11, the serial I/F section 16, the audio I/F section 15 and the call arrival detecting section 17, is provided between the telephone apparatus 31 and the computer apparatus 5. At the time of the circuit exchange, the change-over switch 11 is changed over so as to connect the circuit 32 to the circuit I/F section 6, thereby connecting the telephone apparatus 31 to the telephone circuit 2 so as to allow talking on the phone. During connecting to another computer apparatus, the change-over switch 11 is changed over so as to connect the circuit 32 to the audio I/F section 16 by detection of the call arrival notification signal of the call arrival detecting section 17, thereby sound data is inputted and outputted via the computer apparatus 5. Therefore, talking and the input/output of sound data can be carried out at the same time using the telephone apparatus 31 without providing different structures depending on the kinds of communication. Thus, the input/output interface can be shared in different kinds of communications with a simple structure.

(3) Third Embodiment

Figure 5:
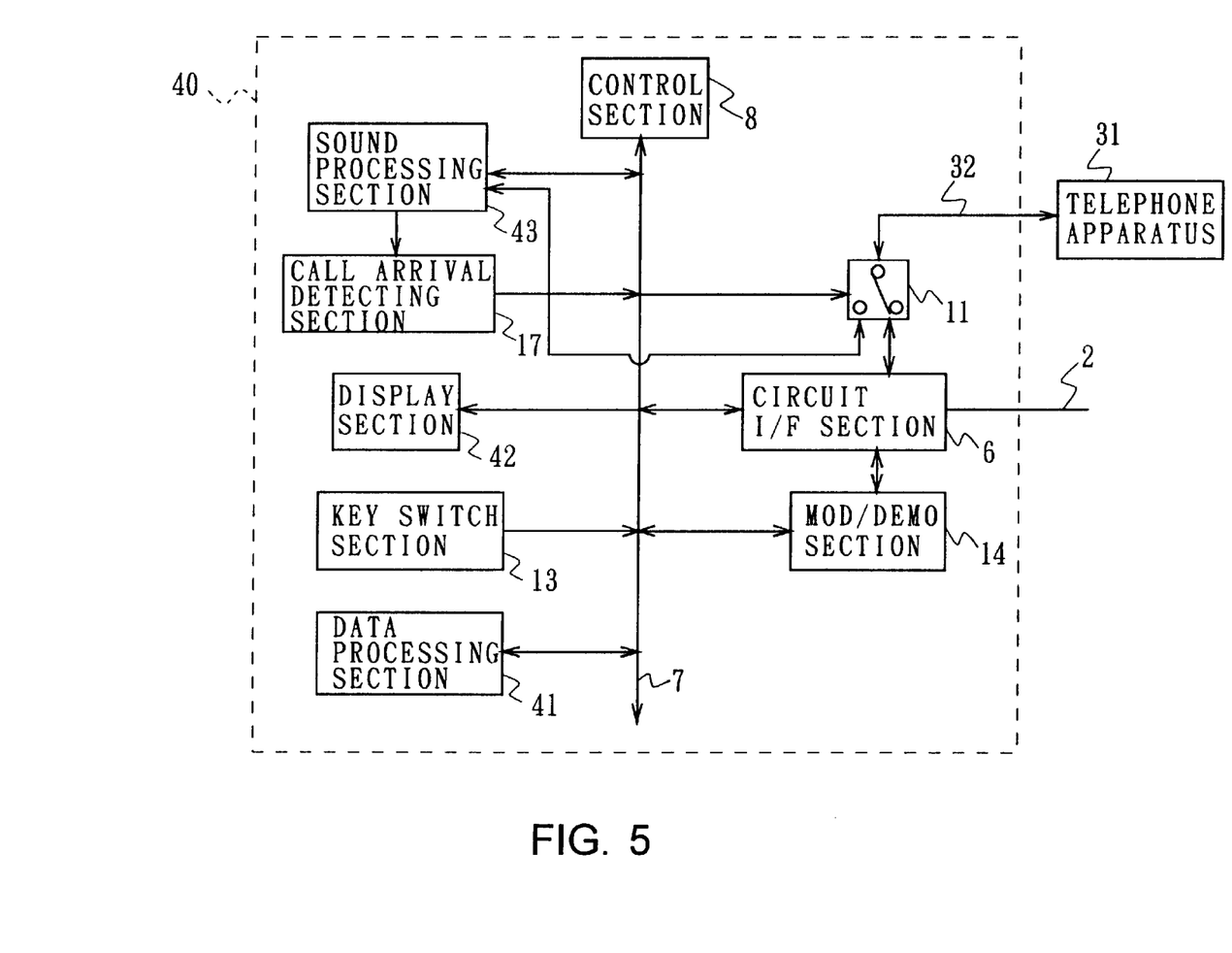
FIG. 5 is a block diagram showing a structure of a computer apparatus according to a third embodiment of the present invention.

In FIG. 5 where the same reference numerals are applied to parts corresponding to FIGS. 2 to 4, numeral 40 shows a computer apparatus as a whole, which is connected to another telephone apparatus or another computer apparatus through the telephone circuit 2. In addition, the computer apparatus 40 is connected to the telephone apparatus 31 using the circuit 32.

The computer apparatus 40 inputs the data signal received through the telephone circuit 2, to the circuit I/F section 6. At the time of circuit exchange, the circuit I/F section 6 recognizes from the frequency or the like of the signal whether or not the data signal is a call signal from another telephone apparatus. If the signal is a call signal from another telephone apparatus, the recognition result is notified to the control section 8 through the internal bus 7.

The control section 8 sends the change-over signal to the change-over switch 11 through the internal bus 7, depending on the notification. Here, the circuit I/F section 6 is connected to the one input terminal of the change-over switch 11 while the output terminal of the change-over switch 11 is connected with the circuit 32. The change-over switch 11 changes over the switch so as to connect the input terminal to which the circuit I/F section 6 is connected, to the output terminal to which the circuit 32 is connected, in accordance with the change-over signal. As a consequence, the computer apparatus 40 connects the circuit 32 to the telephone circuit 2 via the change-over switch 11 and the circuit I/F section 6, thereby connecting the telephone apparatus 31 to the telephone circuit 2 to establish talking on the phone.

Incidentally, the computer apparatus 40 has a key switch section 13. When the key switch section 13 is operated to input a desired telephone number, the telephone number is supplied to the control section 8 via the internal bus 7. The control section 8 issues a call to the other party having the telephone number via the internal bus 7, the circuit I/F section 6 and the telephone circuit 2, respectively.

On the other hand, if the inputted data signal is not a call signal from another telephone apparatus, the circuit I/F section 6 supplies the data signal to the modulating/demodulating section 14. Incidentally, this is the case where the data is transmitted via the telephone circuit 2 between, for example, the computer apparatus on the side of the other party and the computer apparatus 40. It is supposed that a connection to the computer apparatus on the side of the other party is already established.

The modulating/demodulating section 14 performs an expanding process on the supplied data signal when the data signal has been compressed. At the same time, the data signal is subjected to a demodulating process and analog/digital conversion to be converted into a digital signal S1. The modulating/demodulating section 14 supplies the obtained digital signal S1 to the data processing section 41 through the internal bus 7. The data processing section 41 performs a predetermined data processing on the digital signal S1 to output and display characters and images on the display section 42.

Further, in the case where the digital signal S1 includes sound data, the sound data is supplied to the sound processing section 43 through the internal bus 7. The sound processing section 43 converts the sound data into an analog audio signal S2 to be supplied to the call arrival detecting section 17 and the other input terminal of the change-over switch 11.

In the case where the call arrival detecting section 17 detects a sound signal showing a call arrival notification from the audio signal S2, the call arrival detecting section 17 notifies the control section 8 of the call arrival. For example, at the time of the call arrival from the computer apparatus on the side of the other party, the data signal includes a call arrival notification signal. For example, in the case of Internet, the call arrival notification signal comprises a tone signal of 400 [Hz], and the tone signal cannot be detected with the circuit I/F section 6. The computer apparatus 40 converts the call arrival notification signal into an analog sound signal using the sound processing section 43, and detects the call arrival using the obtained audio signal S2.

The control section 8 sends a change-over signal to the change-over switch 11 through the internal bus 7 in response to the notification. Accordingly, the change-over switch 11 changes over the connection of the switch so as to connect the input terminal to which the sound processing section 43 is connected, to the output terminal to which the circuit 32 is connected. As a consequence, the computer apparatus 40 connects the circuit 32 to the sound processing section 43 via the change-over switch 11 so that the sound data included in the data signal is outputted from the speaker of the telephone apparatus 31. Further, in the case where the telephone apparatus 31 is connected to the audio I/F section 16 via the change-over switch 11 in this way, the audio I/F section 16 supplies a notification signal to the telephone apparatus 31, in order to notify the user of the call arrival by ringing the ringer of the telephone apparatus 31 (not shown).

Further, in the case where sound is inputted from the microphone of the telephone apparatus 31 in the state of such an established connection, the sound is converted into a sound signal to be given to the sound processing section 43 via the change-over switch 11. The sound processing section 43 processes the sound signal to generate a digital signal S1 to be supplied to the data processing section 41 through the internal bus 7. The data processing section 41 supplies the digital signal S1 based on the sound signal and the digital signal S1 comprising characters and images to the modulating/demodulating section 14. The modulating/demodulating section 14 compresses the data of the digital signal S1, and then converts the digital signal S1 into an analog signal while modulating the signal by a predetermined modulation method thereby generating a data signal, and sends the data signal to the telephone circuit 2 via the circuit I/F section 6 to transmit it to the computer apparatus on the side of the other party.

In the aforementioned structure, at the time of circuit exchange, the computer apparatus 40 recognizes through the circuit I/F section 6 that the received data signal is from another telephone apparatus, and notifies the control section 8 of the recognition. The connection of the change-over switch 11 is changed over by the switch-over signal which is sent from the control section 8, so that the telephone apparatus 31 is connected to the telephone circuit 2 via the circuit 32, the change-over switch 11 and the circuit I/F section 6, thereby establishing a connection for talking on the phone.

Further, when the data signal is received via the telephone circuit 2 during connecting with another computer apparatus, the data signal is given to the modulating/demodulating section 14 via the circuit I/F section 6 so that the data expanding process, the demodulating process, and conversion to the digital signal S1 are carried out. The obtained digital signal S1 is given to the data processing section 41 through the internal bus 7. The digital signal S1 is subjected to data processing by the data processing section 41, to be outputted and displayed on the display section 42 as characters and images.

Further, in the case where the data signal includes sound data, the sound data is given to the sound processing section 43, and extracted from the digital signal S1 and processed to be supplied to the call arrival detecting section 17 and the change-over switch 11 as an audio signal S2. At this time, the call arrival notification signal added to the data signal at the time of the start of call arrival is detected by the call arrival detecting section 17, and the connection of the change-over switch 11 is changed over using the change-over signal supplied from the control section 8 in accordance with the detection result, so that sound based on the audio signal S2 is outputted from the speaker of the telephone apparatus 31. Furthermore, in the case where sound is inputted from the microphone of the telephone apparatus 31 at the time of such connection, the sound is given to the sound processing section 43 via the circuit 32 and the change-over switch 11 as a sound signal, and is subjected to sound processing to be converted into digital sound data. Thus obtained sound data and the character and image data generated at the data processing section 41 are supplied as digital signals S1 to the modulating/demodulating section 14 to be subjected to the compression process, digital/analog conversion and modulating process, and then the signal is sent via the circuit I/F section 6 and the telephone circuit 2 to be transmitted to another computer apparatus. As a consequence, the computer apparatus 40 is capable of transmitting data to another computer apparatus 40.

In this manner, at the time of circuit exchange with another telephone apparatus and the time of data transmission with another computer apparatus, the computer apparatus 40 recognizes through the circuit I/F section 6 or the call arrival detecting section 17 whether the received data signal is from another telephone apparatus or from another computer apparatus, in order to change over the connection of the change-over switch 11, so that sound can be inputted and outputted by the telephone apparatus 31 in both cases described above. Furthermore, since a desired telephone number is inputted from the key switch section 13, it is possible to issue a call to the desired party both at the time of circuit exchange with another telephone apparatus and at the time of data transmission with another computer apparatus.

As a consequence, the computer apparatus 40 can use the interface for the input/output of sound and the issue of call in different kinds of communications, with the same structure, with the result that it becomes unnecessary to separately provide these structures depending on the telephone apparatus 31 and the kinds of communications.

According to the aforementioned structure, the telephone apparatus 31 is connected to the change-over switch 11 with the circuit 32. At the time of circuit exchange, the change-over switch 11 is changed over so as to connect the circuit 32 to the circuit I/F section 6 as a result of the recognition of the circuit I/F section 6, in order to establish talking. Besides, during connecting to another computer apparatus, the change-over switch 11 is changed over so as to connect the circuit 32 to the sound processing section 43 as a result of the detection of the call arrival notification signal of the call arrival detecting section 17, in order to input and output sound data. Therefore, talking and the input/output of sound data can be performed with the telephone apparatus 31 without providing separate structures depending on the kinds of communication, thereby making it possible to share the input/output interface in different kinds of communication with a simple structure.

(4) Fourth Embodiment

Figure 6:
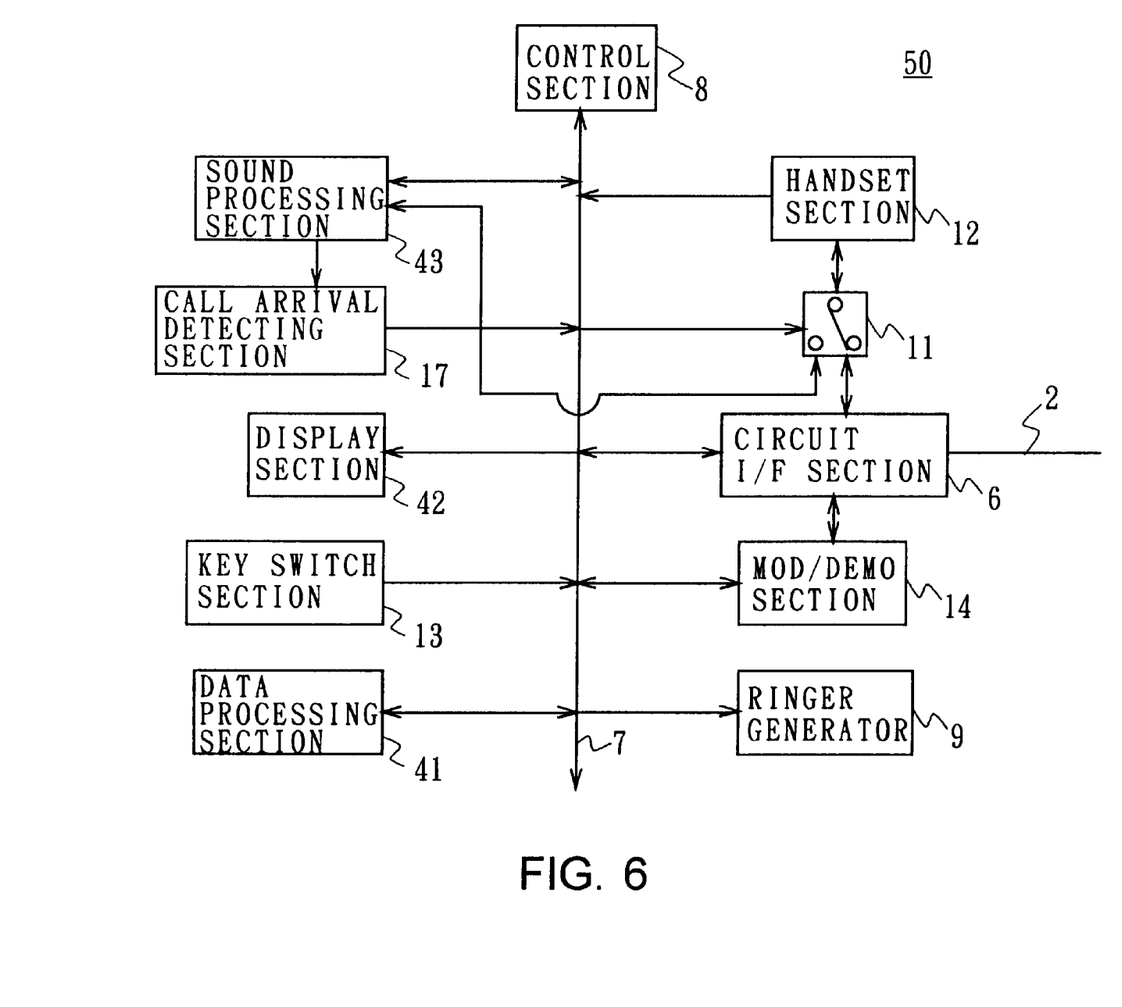
FIG. 6 is a block diagram showing a structure of a communication terminal device according to a fourth embodiment of the present invention.

In FIG. 6 where the same reference numerals are applied to parts corresponding to FIGS. 2 and 5, numeral 50 shows a communication terminal device as a whole, which is connected to another telephone apparatus and another computer apparatus via the telephone circuit 2. The communication terminal device 50 inputs the received data signal to the circuit I/F section 6. The circuit I/F section 6 recognizes from the frequency or the like of the received signal whether or not the data signal is a call signal from another telephone apparatus. If the data signal is a call signal from another telephone apparatus, the circuit I/F section 6 notifies the control section 8 of the result through the internal bus 7. The control section 8 supplies the control signal to the ringer generator 9 and the display section 42 through the internal bus 7 in response to the notification. The ringer generator 9 outputs a call arrival sound in accordance with the control signal and the display section 42 displays a predetermined notification, to notify the user of the call arrival.

Here, the circuit I/F section 6 is connected to one input terminal of the change-over switch 11 while the handset section 12 is connected to the output terminal of the change-over switch 11. The control section 8 supplies the control signal to the ringer generator 9 and the display section 42, and then detects the hook state of the handset section 12. In the case where the user picks up the handset section 12 having a microphone and a speaker in response to the call arrival notification, the control section 8 detects the off-hook state of the handset section 12, so that a change-over signal is sent to the change-over switch 11. Accordingly, the change-over switch 11 changes over the switch so as to connect the input terminal to which the circuit I/F section 6 is connected, to the output terminal to which the handset section 12 is connected.

As a consequence, the communication terminal device 50 connects the handset section 12 to the telephone circuit 2 via the change-over switch 11 and the circuit I/F section 6, thereby establishing connection for talking on the phone.

Incidentally, the communication terminal device 50 has a key switch section 13. When a desired telephone number is inputted by operating the key switch section 13, the telephone number is supplied to the control section 8 through the internal bus 7. The control section 8 issues a call to the party having the telephone number via the internal bus 7, the circuit I/F section 6 and the telephone circuit 2, respectively.

Further, when the user places the handset section 12 at the original position, the control section 8 detects the on-hook state of the handset section 12, thereby terminating a talk on the phone.

On the other hand, if the inputted data is not a call signal from another telephone apparatus, the circuit I/F section 6 supplies the data signal to the modulating/demodulating section 14. Incidentally, this is the case in which data is transmitted between the computer apparatus on the side of the other party and the communication terminal device 50 through the telephone circuit 2. It is supposed that a connection with the computer apparatus on the side of the other party is already established.

The modulating/demodulating section 14 performs an expanding process on the supplied data signal in the case where the data signal has been compressed, while performing a demodulating process and an analog-digital conversion, to convert the signal into a digital signal S1. The modulating/demodulating section 14 sends the obtained digital signal S1 to the data processing section 41 through the internal bus 7. The data processing section 41 performs a predetermined data processing on the digital signal S1 to output and display characters and images on the display section 42.

Further, in the case where the digital signal S1 includes sound data, the data processing section 41 supplies the sound data to the sound processing section 43 through the internal bus 7. The sound processing section 43 converts the sound data comprising digital data into an analog audio signal S2 to be supplied to the call arrival detecting section 17 and the other input terminal of the change-over switch 11.

In the case where the call arrival detecting section 17 detects the sound signal showing the call arrival notification from the audio signal S2, it notifies the control section 8 of the call arrival. For example, at the time of call arrival from the computer apparatus on the side of the other party, the data signal includes a call arrival notification signal. For example, in the case of the Internet, the call arrival notification signal comprises a tone signal of 400 [Hz], and the signal cannot be detected at the circuit I/F section 6. The communication terminal device 50 converts the call arrival notification signal into an analog sound signal so that the call arrival can be detected by detecting the sound signal showing the call arrival notification from the frequency or the like of the obtained audio signal S2.

The control section 8 supplies a control signal to the ringer generator 9 and the display section 42 through the internal bus 7. Accordingly, the ringer generator 9 outputs a call arrival sound which is different from the aforementioned case of circuit exchange, while the display section 42 blinks in different way from the case of the circuit exchange, in order to notify the user of call arrival from the computer apparatus on the side of the other party.

When the user picks up the handset section 12 having a microphone and a speaker in response to the call arrival notification, the control section 8 detects the off-hook state of the handset section 12 and sends a change-over signal to the change-over switch 11. Accordingly, the change-over switch 11 changes over the connection of the switch so as to connect the input terminal to which the sound processing section 43 is connected, to the output terminal to which the handset section 12 is connected. As a consequence, the communication terminal device 50 connects the handset section 12 to the sound processing section 43 via the change-over switch 11, thereby outputting sound from the speaker of the handset section 12 on the basis of the audio signal S2.

Further, in the case where sound is inputted from the microphone of the handset section 12 in the state of an established connection, the sound is converted into a sound signal to be given to the sound processing section 43 via the change-over switch 11. The sound processing section 43 processes the sound signal to generate a digital signal S1 to be supplied to the modulating/demodulating section 14. The modulating/demodulating section 14 compresses the digital signal Si, then converts the signal into an analog signal while modulating the signal in accordance with a predetermined modulation method, thereby generating a data signal. The data signal is sent to the telephone circuit 2 via the circuit I/F section 6 to be transmitted to the computer apparatus on the side of the other party.

Incidentally, similarly to the time of circuit exchange, when the user replaces the handset section 12 at the original position, the control section 8 detects the on-hook state of the handset 12, thereby terminating data transmission with the computer apparatus on the side of the other party.

In the aforementioned structure, at the time of circuit exchange, the communication terminal device 50 recognizes by the circuit I/F section 6 that the received data signal is from another telephone apparatus, and notifies the control section 8 of the result of the recognition. The connection of the change-over switch 11 is changed over by the change-over signal which is sent from the control section 8 at the time of the off-hook state of the handset section 12, with the result that the handset section 12 is connected to the telephone circuit 2 via the change-over switch 11 and the circuit I/F section 6 thereby establishing a connection for talking on the phone.

Further, when the data signal is received through the telephone circuit 2 during connecting with another computer apparatus, the data signal is given to the modulating/demodulating section 14 via the circuit I/F section 6, to be subjected to the data expanding process, demodulating process, and conversion to the digital signal S1. The obtained digital signal S1 is given to the data processing section 41 through the internal bus 7. The digital signal S1 is outputted and displayed as characters and images on the display section 42 by data processing of the data processing section 41.

Further, in the case where the received data signal includes sound data, the digital signal S1 is given to the sound processing section 43 wherein the digital signal S1 is converted into an audio signal S2 by sound processing of the sound processing section 43 and is supplied to the call arrival detecting section 17 and the change-over switch 11. At this time, the call arrival notification signal added to the data signal at the time of the start of call arrival is detected by the call arrival detecting section 17 so that the connection of the change-over switch 11 is changed over by the change-over signal which is sent from the control section 8 in accordance with the detection result and the off-hook of the handset section 12, thereby outputting sound based on the audio signal S2 from the speaker of the handset section 12. In addition, in the case where sound is inputted from the microphone of the handset section 12 during such a connection, the sound is given to the sound processing section 43 via the change-over switch 11 as a sound signal to be converted into digital sound data. The obtained sound data and characters and images generated at the data processing section 41 are sent via the modulating/demodulating section 14, the circuit I/F section 6 and the telephone circuit 2 as a digital signal S1 to be transmitted to another computer apparatus. As a consequence, the communication terminal device 50 is capable of transmitting data to another computer apparatus.

In this manner, at the time of circuit exchange with another telephone apparatus and the time of data transmission with another computer apparatus, the communication terminal device 50 recognizes by the circuit I/F section 6 or the call arrival detecting section 17 whether the received data signal is sent from another telephone apparatus or from another computer apparatus, so as to change over the change-over switch 11, with the result that sound can be inputted and outputted with the handset section 12 in both aforementioned cases. In addition, similarly, the ringer generator 9 outputs different call arrival notification sounds at the time of circuit exchange with another telephone apparatus and at the time of data transmission with another computer apparatus, thereby making it possible to differentiate whether the received data signal is from another telephone apparatus or from another computer apparatus.

Further, the off-hook and on-hook states of the handset section 12 can control the start and end of the call on the phone at the time of circuit exchange with another telephone apparatus and moreover, can control the start and end of data transmission at the time of data transmission with another computer apparatus. In addition, since a desired telephone number is inputted from the key switch section 13, a call can be issued to a desired party both at the time of circuit exchange with another telephone apparatus and at the time of data transmission with another computer apparatus.

As a consequence, in the communication terminal device 50, the interface for the input/output of sound, the call arrival notification, the control of the start and end of communication, and the issue of call can be shared with the same structure, so that it can be unnecessary to separately provide these structures corresponding to different kinds of communication.

In the aforementioned structure, the change-over switch 11 is changed over so as to connect the handset section 12 to the circuit I/F section 6 by the recognition of the circuit I/F section 6 at the time of circuit exchange, to establish a connection for talking on the phone. Besides, the change-over switch 11 is changed over so as to connect the handset section 12 to the sound processing section 43 by the detection of the call arrival notification signal of the call arrival detecting section 17 during connecting with another computer apparatus, to input and output sound data. Therefore, separate structures do not need to be provided for different kinds of communications, and the handset section 12 can establish talking on the phone and can input and output sound data, thereby making it possible to share the input/output interface in different kinds of communications with a simple structure.

(5) Other Embodiments

Incidentally, in the aforementioned first and fourth embodiments, the user is notified of the call arrival by the sound output of the ringer generator 9. However, the present invention is not limited thereto and a vibrator can be provided so that the user can be notified of the call arrival by generating a predetermined vibration pattern using the vibrator.

Further, in the first to fourth embodiments, at the time of circuit exchange, it is recognized by detection of frequency or the like by the circuit I/F section 6 whether or not the signal is received from another telephone apparatus and in addition, at the time of connecting to another computer apparatus, the sound data is extracted by sound processing from the received data signal, as an analog audio signal S2, which is recognized by detection of frequency components or the like by the call arrival detecting section 17. However, the present invention is not limited thereto and in the case where the telephone number is notified from the sender, a plurality of parties to which the communication is connected can be registered in advance so that it can be recognized based on the telephone number notified at the time of call arrival whether the party is connected from a telephone apparatus or from a computer apparatus.

Further, in the aforementioned first and fourth embodiments, sound is inputted and outputted by the handset section 12. However, the present invention is not limited thereto and a speaker or a microphone can be provided in the place of the handset section 12 to input and output sound. Incidentally, in this case, the key switch section 13 is operated, as a replacement for notifying the control section 8 of the on-hook or the off-hook state of the handset section 12, to supply a command showing communication start or communication end to the control section 8. Thus, the same advantage can be obtained as in the case of the first and fourth embodiments.

Further, in the aforementioned first to fourth embodiments, the apparatus of the invention is connected to another telephone apparatus and to another computer apparatus through the public telephone circuit, which is an analog circuit. However, the present invention is not limited thereto and the invention can be applied to a case in which the apparatus of the invention is connected via ISDN, the Internet, a radio communication circuit or the like. In this case, the same advantage can be obtained as with the aforementioned first and fourth embodiments.

Furthermore, in the aforementioned first to fourth embodiments, at the time of call arrival from another computer apparatus, a tone signal for notifying the call arrival is extracted from the received data signal and the tone signal is detected from the audio signal S2 using the call arrival detecting section 17 to distinguish the call arrival. However, the present invention is not limited thereto and a call signal from another computer apparatus can be detected to detect the call arrival.

According to the present invention as described above, the computer apparatus for extracting an output sound signal from inputted reception digital data and sending the output sound signal and moreover, for converting an inputted input sound signal into transmission digital data and sending the transmission digital data, comprises: a data input/output means, in the case of connecting to another computer apparatus through a telephone circuit to send and receive data, for converting a received analog signal into reception digital data and supplying the reception digital data to the computer apparatus and moreover, for converting transmission digital data which is sent from the computer apparatus into an analog signal and transmitting the analog signal to another computer apparatus; a sound input/output means, in the case of connecting to another computer apparatus, for outputting sound based on an inputted output sound signal and moreover, for sending an input sound signal obtained by inputting sound; and a connection switching means for connecting the telephone circuit to the sound input/output means in the case of connecting to another telephone apparatus and more over, in the case of connecting to another computer apparatus, for connecting the computer apparatus to the sound input/output means, so that sound can be inputted and outputted by the sound input/output means both in cases of connecting to another telephone apparatus and another computer apparatus and moreover, so that the sound input/output interface can be shared. Thus, the telephone apparatus capable of connecting to different kinds of communication networks can be realized with a simple structure.

Further, according to the present invention, a data input/output means for converting an analog signal received through the telephone circuit into reception digital data and sending the reception digital data and moreover, for converting inputted transmission digital data into an analog signal and sending the analog signal, and a connection switching means for connecting the telephone circuit to the telephone apparatus in the case of connecting to another telephone apparatus and moreover, in the case of connecting to another computer apparatus, for connecting the telephone apparatus to another computer apparatus are provided, so that sound can be inputted and outputted via the telephone apparatus both in the cases of connecting to another telephone apparatus and to another computer apparatus, and so that the sound input/output interface can be shared. Thus, a modem device capable of connecting to different kinds of communication networks can be realized with a simple structure.

Further, according to the present invention, a data input/output means for converting an analog signal received through the telephone circuit into reception digital data and sending the reception digital data and moreover, for converting inputted transmission digital data into an analog signal and sending the analog signal, a data processing means for extracting an output sound signal from the reception digital data given from the data input/output means and sending the output sound signal and moreover, for converting an inputted input sound signal into transmission digital data to supply the transmission digital data to the data input/output means, a connection switching means for connecting the telephone circuit to the telephone apparatus in the case of connecting to another telephone apparatus and for connecting the telephone apparatus to the data processing means in the case of connecting to another computer apparatus are provided, so that sound can be inputted and outputted via the telephone apparatus both in the cases of connecting to another telephone apparatus and another computer apparatus and so that the sound input/output interface can be shared. Thus, a computer apparatus capable of connecting to different kinds of communication networks can be realized with a simple structure.

Furthermore, according to the present invention, data is sent and received by connecting to another telephone apparatus or another computer apparatus via the telephone circuit, and a data input/output means, in the case of connecting to another computer apparatus via the telephone circuit, for converting a received analog signal into reception digital data and sending the reception digital data and moreover, for converting inputted transmission digital data into an analog signal and sending the analog signal, a data processing means for extracting an output sound signal from the reception digital data given from the data input/output means and sending the output sound signal and moreover, for converting an inputted input sound signal into transmission digital data to supply the transmission digital data to the data input/output means, a sound input/output means, in the case of connecting to another computer apparatus, for outputting sound based on the output sound signal and moreover, for sending the input sound signal obtained by inputting sound, and a connection switching means for connecting the telephone circuit to the sound input/output means in the case of connecting to another telephone apparatus and moreover, for connecting the data processing means to the sound input/output means in the case of connecting to another computer apparatus are provided, so that sound can be inputted and outputted through the sound input/output means both in the cases of connecting to another telephone apparatus and another computer apparatus, and so that the sound input/output interface can be shared. Thus, a communication terminal apparatus capable of connecting to different kinds of communication networks can be realized with a simple structure.

While the preferred embodiments of the invention have been described, it will be obvious to those skilled in the art that various changes and modifications may be aimed, therefore, to cover in the appended claims all such changes and modifications as fall within the true spirit and scope of the invention.

What is claimed is:

1. A telephone apparatus connected to computer apparatus, comprising:

data input/output means for converting an analog signal received through a telephone circuit into digital data, for supplying said digital data to an internal computer apparatus, for converting transmission digital data transmitted from said internal computer apparatus into said analog signal, and for transmitting said analog signal to an external computer apparatus via said telephone circuit;

sound input/output means, connected to said internal computer apparatus for extracting an output audio signal from reception digital data inputted from said data input/output means, for sending said output audio signal while converting an input audio signal into transmission digital data to be supplied to said data input/output means, and for outputting sound based on said output audio signal while sending said input audio signal which is obtained by inputting sound when said telephone apparatus is connected to said external computer apparatus via said telephone circuit; and connection switching means for connecting said telephone circuit to said sound input/output means when said telephone apparatus is connected to an external telephone apparatus via said telephone circuit and for connecting said internal computer apparatus to said sound input/output means when said telephone apparatus is connected to said external computer apparatus via said telephone circuit.

2. The telephone apparatus according to claim 1, wherein said data input/output means comprises:

circuit connecting means for detecting a telephone call arrival from said external telephone apparatus while said telephone is connected to said external telephone apparatus through said telephone circuit and for sending and receiving data through said telephone circuit; and data modulating/demodulating means for performing an expanding processing and demodulating processing on said analog signal received from said external computer apparatus in order to send said reception digital data to said internal computer apparatus while performing a compressing processing and modulating processing on said transmission digital data from said internal computer apparatus, in order to send said analog signal to said circuit connecting means.

3. The telephone apparatus according to claim 2, wherein said data input/output means comprises:

call arrival detecting means for detecting a computer call arrival from said external computer apparatus on a basis of said output audio signal from said internal computer apparatus.

4. The telephone apparatus according to claim 3, comprising:

sound call arrival notifying means for outputting respective different call arrival sounds corresponding to respective detection results of said circuit connecting means and said call arrival detecting means.

5. The telephone apparatus according to claim 3, comprising:

display call arrival notifying means for outputting and displaying respective different display patterns corresponding to respective detection results of said circuit connecting means and said call arrival detecting means.

6. The telephone apparatus according claim 3, comprising:

vibration call arrival notifying means for outputting respective different vibration patterns corresponding to respective detection results of said circuit connecting means and said call arrival detecting means.

7. A modem device connected to a computer apparatus and a telephone apparatus, comprising:

data input/output means, operable when said modem device is connected to an external computer apparatus through a telephone circuit, for converting a received analog signal into reception digital data to be sent to an internal computer apparatus while converting inputted transmission digital data into said analog signal to be transmitted to said external computer apparatus via said telephone circuit; and connection switching means, connected to an internal telephone apparatus for inputting and outputting sound and connected to said internal computer apparatus for extracting an output sound signal from said reception digital data from said data input/output means while converting an input audio signal into said transmission digital data to be supplied to said data input/output means, for connecting said telephone circuit to said internal telephone apparatus when said modem device is connected to an external telephone apparatus, or for connecting said telephone circuit to said internal computer apparatus when said modem device is connected to said external computer apparatus.

8. The modem device according to claim 7, wherein said data input/output means comprises:

circuit connecting means for detecting a telephone call arrival from said external telephone apparatus while said modem device is connected to said external telephone apparatus through said telephone circuit and for sending and receiving data through said telephone circuit; and data modulating/demodulating means for performing an expanding processing and demodulating processing on said analog signal received from said external computer apparatus in order to send said reception digital data to said internal computer apparatus while performing a compressing processing and modulating processing on said transmission digital data from said internal computer apparatus, in order to send said analog signal to said circuit connecting means.

9. The modem device according to claim 8, wherein said data input/output means comprises:

call arrival detecting means for detecting a computer call arrival from said external computer apparatus on a basis of said output audio signal from said internal computer apparatus.

10. A computer apparatus comprising:

data input/output means for converting an analog signal received through a telephone circuit into reception digital data while converting inputted transmission digital data into said analog signal to be transmitted through said telephone circuit;

data processing means for extracting an output audio signal from said reception digital data inputted from said data input/output means so as to send said output audio signal through said telephone circuit while converting an input audio signal into said transmission digital data to be supplied to said data input/output means; and connection switching means, connected to an internal telephone apparatus for inputting and outputting sound, for connecting said telephone circuit to said internal telephone apparatus when said computer apparatus is connected to an external telephone apparatus, or for connecting said internal telephone apparatus to said data processing means when said computer apparatus is connected to another computer apparatus.

11. The computer apparatus according to claim 10, wherein said data input/output means comprises:

circuit connecting means for detecting telephone call arrival from said external telephone apparatus when said computer apparatus is connected to said external telephone apparatus through said telephone circuit and for sending and receiving data through said telephone circuit; and data modulating/demodulating means for performing an expanding processing and demodulating processing on said analog signal received from said another computer apparatus so as to send said reception digital data to said data processing means while performing a compressing processing and modulating processing on said transmission digital data inputted from said data processing means so as to send said analog signal to said circuit connecting means.

12. The computer apparatus according to claim 11, wherein said data input/output means comprises:

call arrival detecting means for detecting a computer call arrival from said another computer apparatus on a basis of said output audio signal.

13. The computer apparatus according to claim 11, wherein said data input/output means comprises:

call arrival detecting means for detecting said computer call arrival from said another computer apparatus on a basis of a call signal included in said analog signal received from said another computer apparatus.

14. A communication terminal device comprising:

data input/output means, connected to a telephone apparatus or a computer apparatus through a telephone circuit so as to send and receive data, when said communication terminal device is connected to said computer apparatus through said telephone circuit, for converting a received analog signal into reception digital data while converting inputted transmission digital data into said analog signal to be sent through said telephone circuit;

data processing means for extracting an output audio signal from said reception digital data from said data input/output means while converting an input audio signal into said transmission digital data to be supplied to said data input/output means;

sound input/output means, operable when said communication terminal device is connected to said computer apparatus, for outputting sound based on said output audio signal while sending said input audio signal which is obtained by inputting sound; and connection switching means for connecting said telephone circuit to said sound input/output means when said communication terminal device is connected to said telephone apparatus, and for connecting said data processing means to said sound input/output means when said communication terminal device is connected to said computer apparatus.

15. The communication terminal device according to claim 14, wherein said data input/output means comprises:

circuit connecting means for detecting telephone call arrival from said telephone apparatus while said communication terminal device is connected to said telephone apparatus through said telephone circuit and for sending and receiving data through said telephone circuit; and data modulating/demodulating means for performing an expanding processing and demodulating processing on said analog signal received from said computer apparatus so as to send said reception digital data to said data processing means while performing a compressing processing and modulating processing on said transmission digital data inputted from said data processing means so as to send said analog signal to said circuit connecting means.

16. The communication terminal device according to claim 15, wherein said data input/output means comprises:

call arrival detecting means for detecting a computer call arrival from said computer apparatus on a basis of said output audio signal.

17. The communication terminal device according to claim 15, wherein said data input/output means comprises:

call arrival detecting means for detecting said computer call arrival from said computer apparatus on a basis of a call signal included in said received analog signal.

18. The communication terminal device according to claim 16, comprising:

sound call arrival notifying means for outputting respective different call arrival sounds corresponding to respective detection results of said circuit connecting means and said call arrival detecting means.

19. The communication terminal device according to claim 16, comprising:

display call arrival notifying means for outputting and displaying respective different display patterns corresponding to respective detection results of said circuit connecting means and said call arrival detecting means.

20. The communication terminal device according to claim 16, comprising:

vibration call arrival notifying means for outputting respective different vibration patterns corresponding to respective detection results of said circuit connecting means and said call arrival detecting means.

21. The communication terminal device according to claim 17, comprising:

sound call arrival notifying means for outputting respective different call arrival sounds corresponding to respective detection results of said circuit connecting means and said call arrival detecting means.

22. The communication terminal device according to claim 17, comprising:

display call arrival notifying means for outputting and displaying respective different display patterns corresponding to respective detection results of said circuit connecting means and said call arrival detecting means.

23. The terminal device according to claim 17, comprising:

vibration call arrival notifying means for outputting respective different vibration patterns corresponding to respective detection results of said circuit connecting means and said call arrival detecting means.

* * * * *